United States Patent
Neul et al.

(10) Patent No.: US 9,110,090 B2
(45) Date of Patent: Aug. 18, 2015

(54) PIEZORESISTIVE MICROMECHANICAL SENSOR COMPONENT AND CORRESPONDING MEASURING METHOD

(75) Inventors: Reinhard Neul, Stuttgart (DE); Christian Rettig, Reutlingen (DE); Achim Trautmann, Leonberg (DE); Daniel Christoph Meisel, Vaihingen An der Enz (DE); Alexander Buhmann, Reutlingen (DE); Manuel Engesser, Buehl (DE); Ando Feyh, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 360 days.

(21) Appl. No.: 13/635,581

(22) PCT Filed: Jan. 19, 2011

(86) PCT No.: PCT/EP2011/050641
§ 371 (c)(1),
(2), (4) Date: Nov. 26, 2012

(87) PCT Pub. No.: WO2011/113625
PCT Pub. Date: Sep. 22, 2011

(65) Prior Publication Data
US 2013/0098154 A1 Apr. 25, 2013

(30) Foreign Application Priority Data
Mar. 18, 2010 (DE) .......................... 10 2010 002 994

(51) Int. Cl.
*G01P 15/12* (2006.01)
*G01P 15/09* (2006.01)
*G01P 15/08* (2006.01)

(52) U.S. Cl.
CPC ............. *G01P 15/09* (2013.01); *G01P 15/0802* (2013.01); *G01P 15/12* (2013.01); *G01P 15/123* (2013.01)

(58) Field of Classification Search
CPC ..... G01P 15/123; G01P 15/18; G01P 15/0802; G01P 15/12; G01P 1/023
USPC .......... 73/514.33, 514.34; 338/2, 5, 43, 46–47
See application file for complete search history.

(56) References Cited

U.S. PATENT DOCUMENTS 4,691,568 A * 9/1987 Rendek ....................... 73/514.33
4,776,924 A  10/1988 Delapierre
(Continued)

FOREIGN PATENT DOCUMENTS

CN        1851472 A     10/2006
CN      101329361 A     12/2008
(Continued)

OTHER PUBLICATIONS

Huang et al., A high-performance micromachined piezoresistive accelerometer with axially stressed tiny beams, Journal of Micromechanics and Microengineering, 2005, pp. 993-1000, IOP Publishing Ltd, UK.
(Continued)

*Primary Examiner* — Helen Kwok
(74) *Attorney, Agent, or Firm* — Maginot, Moore & Beck LLP

(57) ABSTRACT

A piezoresistive micromechanical sensor component includes a substrate, a seismic mass, at least one piezoresistive bar, and a measuring device. The seismic mass is suspended from the substrate such that it can be deflected. The at least one piezoresistive bar is provided between the substrate and the seismic mass and is subject to a change in resistance when the seismic mass is deflected. The at least one piezoresistive bar has a lateral and/or upper and/or lower conductor track which at least partially covers the piezoresistive bar and extends into the region of the substrate. The measuring device is electrically connected to the substrate and to the conductor track and is configured to measure the change in resistance over a circuit path which runs from the substrate through the piezoresistive bar and from the piezoresistive bar through the lateral and/or upper and/or lower conductor track.

16 Claims, 5 Drawing Sheets

(56) References Cited

U.S. PATENT DOCUMENTS

| | | | |
|---|---|---|---|
| 5,395,802 A | 3/1995 | Kiyota et al. | |
| 6,389,899 B1 * | 5/2002 | Partridge et al. | 73/514.33 |
| 7,360,422 B2 * | 4/2008 | Madni et al. | 73/504.12 |
| 7,360,426 B2 * | 4/2008 | Machida et al. | 73/514.33 |
| 8,569,934 B2 * | 10/2013 | Koops et al. | 310/348 |
| 2006/0283248 A1 * | 12/2006 | Sugano et al. | 73/514.34 |
| 2007/0022814 A1 * | 2/2007 | Seto | 73/514.34 |
| 2008/0271535 A1 * | 11/2008 | Hattori et al. | 73/514.33 |
| 2009/0223292 A1 * | 9/2009 | Hatano et al. | 73/514.33 |
| 2010/0005886 A1 * | 1/2010 | Aida et al. | 73/514.34 |
| 2010/0116057 A1 * | 5/2010 | Nakatani | 73/514.33 |

FOREIGN PATENT DOCUMENTS

| | | |
|---|---|---|
| JP | 62-124777 A | 6/1987 |
| JP | 1-222489 A | 9/1989 |
| JP | 2-60271 B2 | 12/1990 |
| JP | 3-202777 A | 9/1991 |
| JP | 3-262973 A | 11/1991 |
| JP | 4-302175 A | 10/1992 |
| JP | 4-361165 A | 12/1992 |
| JP | 8-297137 A | 11/1996 |
| JP | 9-311138 A | 12/1997 |
| JP | 9-318655 A | 12/1997 |
| JP | 10-267779 A | 10/1998 |
| JP | 2004-69619 A | 3/2004 |
| JP | 2007-3211 A | 1/2007 |
| JP | 2008-134185 A | 6/2008 |
| JP | 2008-134186 A | 6/2008 |

OTHER PUBLICATIONS

International Search Report corresponding to PCT Application No. PCT/EP2011/050641, mailed May 31, 2011 (German and English language document) (6 pages).

* cited by examiner

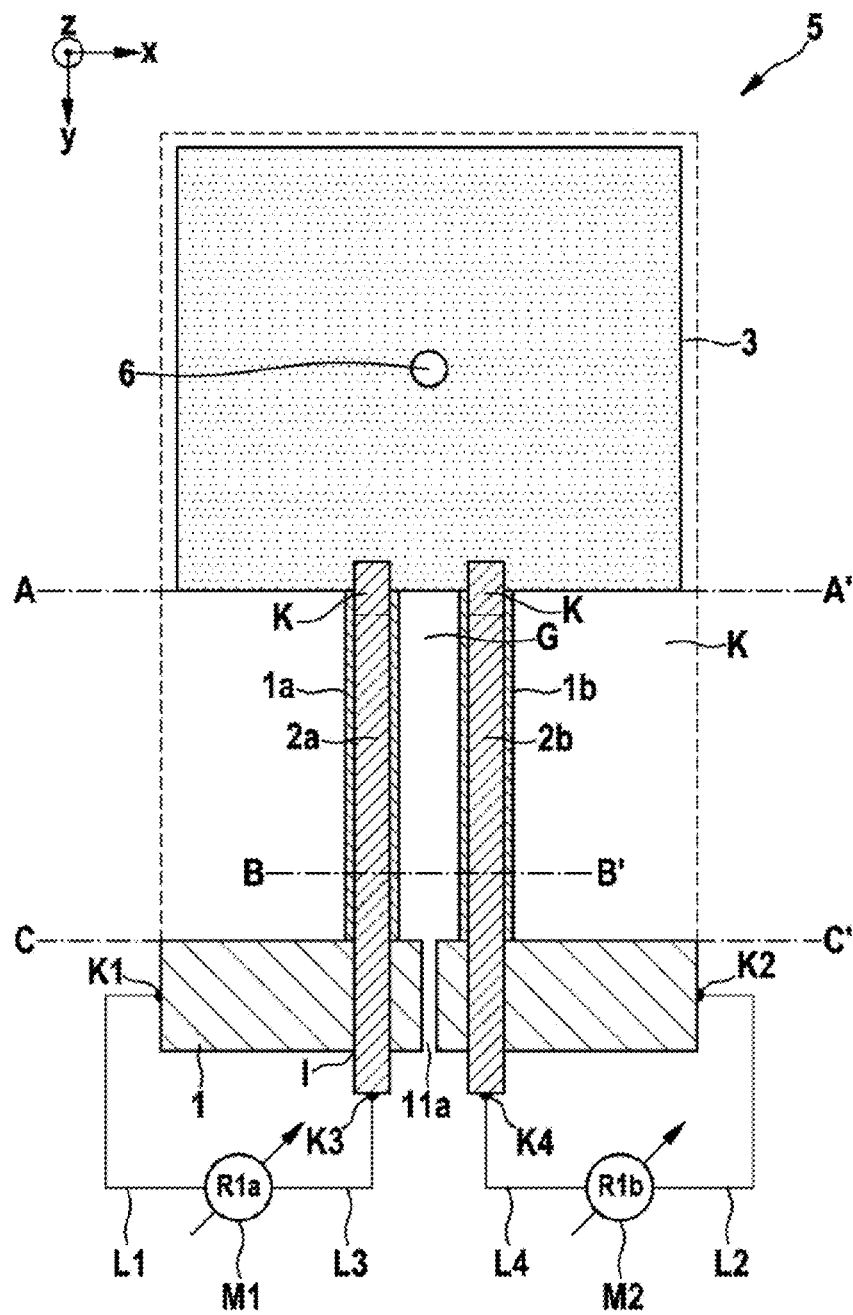

PIEZORESISTIVE MICROMECHANICAL SENSOR COMPONENT AND CORRESPONDING MEASURING METHOD

This application is a 35 U.S.C. §371 National Stage Application of PCT/EP2011/050641, filed on Jan. 19, 2011, which claims the benefit of priority to Serial No. DE 10 2010 002 994.7, filed on Mar. 18, 2010 in Germany, the disclosures of which are incorporated herein by reference in their entirety.

BACKGROUND

The present disclosure relates to a piezoresistive micromechanical sensor component and to a corresponding measuring method.

Although applicable to any piezoresistive micromechanical sensor components, the present disclosure and the problem which it is intended to resolve will be explained with reference to a piezoresistive micromechanical acceleration sensor.

Modern acceleration sensors are conventionally evaluated capacitively. The piezoresistive evaluation which is also practiced, however, offers greater potential with regard to the desired ever increasing miniaturization. In the case of piezoresistively evaluated acceleration sensors, here referred to as piezoresistive acceleration sensors, distinction may essentially be made between the following two variants.

One variant consists in structured doping, piezoresistors being doped at the positions on a bending beam where the maximum mechanical stress occurs during deflection.

The other variant consists in homogeneous doping, the entire homogeneously doped bending beam being used for the evaluation. To this end, a homogeneously distributed mechanical stress is required in the beam. Since the entire bending beam is used for the evaluation in the case of homogeneous doping, homogeneous doping offers advantages with regard to miniaturization.

J. Micromech. Microeng. 15 (2005), pages 993-1000 (Shusen Huang et al.) discloses a piezoresistive micromechanical acceleration sensor comprising homogeneously doped bending beams.

FIG. 6 is a perspective view of this known piezoresistive micromechanical acceleration sensor.

In FIG. 6, reference 1 denotes a substrate on which a sacrificial oxide layer S1 and a cover layer S2 are provided. Structured out of the cover layer S2, there is a seismic mass 3 which is anchored via an undoped bending beam B to the substrate 1. At the tip of the seismic mass 3, a stop 30 is provided, which protects the seismic mass 3 against excessive deflections. Below the seismic mass 3 and the bending beam B, there is a cavity K.

Next to the bending beam B, the seismic mass 3 is connected via two homogeneously doped piezoresistive beams PR1, PR2 to the substrate. In order to record a resistance change of the piezoresistive beams PR1, PR2 when the seismic mass 3 is deflected in the substrate plane, metallization regions M1, M2, M3, M4, M5 are provided, which are interconnected with the piezoresistive beam PR1, PR2 so as to permit half-bridge evaluation.

For signal feedback from the seismic mass 3 to the substrate 1, in this circuit arrangement the bending beam B is fundamentally necessary in addition to the piezoresistive beams PR1, PR2. The additional bending beam B, however, reduces the mechanical sensitivity and/or increases the process outlay with respect to the required trenches, when otherwise assuming the same requirements. In particular, trench isolation (STI) which is as narrow as possible is required between the beams PR1, B, PR2, which entails increased process outlay.

SUMMARY

The piezoresistive micromechanical sensor component according to the disclosure, and the corresponding measuring method, have the advantage over the known solution approaches that a simplified and more economical structure is made possible, which allows further miniaturization.

The concept on which the present disclosure is based resides in the use of a structured conductor track layer, for example a metallic layer, for electrical feedback of the measurement signal on the upper side of the piezoresistive beam or beams.

The electrical evaluation in the piezoresistive micromechanical sensor component according to the disclosure is also associated with various advantages. The conductor track, or return line, provided on the upper side of the piezoresistive beam constitutes a lower parasitic resistance in comparison with a return line in the doped beam. The resistance change can be evaluated separately in each piezoresistive beam. This allows currentless voltage measurement (3-point and 4-point measurement), so that parasitic line resistances do not vitiate the measurement result. DC separation makes a simplified differential evaluation circuit based on current mirrors possible. Such an evaluation method is insensitive to parameter variations in the circuits.

A technological advantage which may be mentioned is that the insulation trench between the beams can be made wider with constant sensitivity. This facilitates the technological production of piezoresistive acceleration sensors which are based on homogeneous doping.

Advantageous refinements and improvements of the respective subject-matter of the disclosure may be found in the dependent claims.

According to a preferred refinement, the seismic mass is suspended from the substrate over the piezoresistive beam or beams. This provides the advantage that the entire mechanical suspension structure can be used for the detection or evaluation. It permits higher mechanical sensitivity, or an area gain because a smaller seismic mass is possible.

According to another preferred refinement, the seismic mass is suspended from the substrate over a connecting beam, the piezoresistive beam being provided between the connecting beam and the substrate. This significantly increases the design freedom.

BRIEF DESCRIPTION OF THE DRAWINGS

Exemplary embodiments of the disclosure are represented in the drawings and described in more detail in the following description.

FIG. 1 illustrates a plan view of a piezoresistive micromechanical sensor component in the form of a micromechanical acceleration sensor arrangement according to a first embodiment of the present disclosure;

DETAILED DESCRIPTION

In the figures, references which are the same denote components which are the same or functionally equivalent.

Figure 2A:
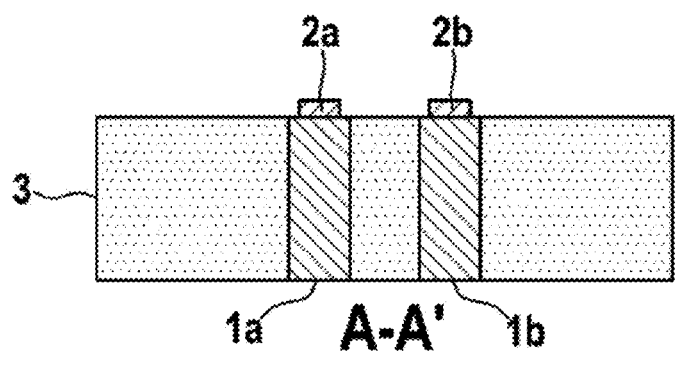
FIGS. 2a-c illustrate cross sections of the piezoresistive micromechanical sensor component in the form of a micromechanical acceleration sensor arrangement according to FIG. 1 along the lines AA', BB' and CC'.
Figure 2B:
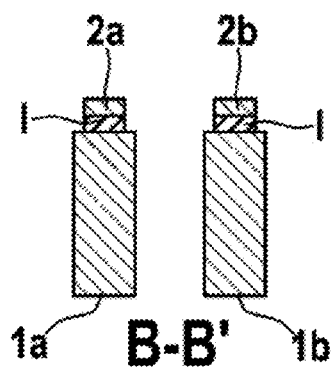
Figure 2C:
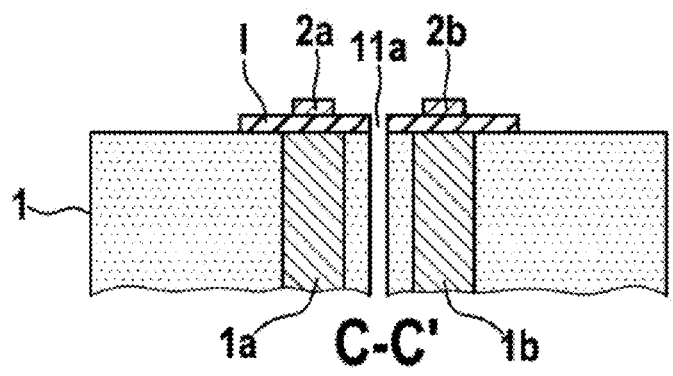

FIG. 1 is a plan view of a piezoresistive micromechanical sensor component in the form of a micromechanical acceleration sensor arrangement according to a first embodiment of the present disclosure, and FIGS. 2a-c illustrate cross sections of the piezoresistive micromechanical sensor component in the form of a micromechanical acceleration sensor arrangement according to FIG. 1 along the lines AA', BB' and CC'.

In FIG. 1, reference 5 denotes a piezoresistive micromechanical acceleration sensor. Starting from the substrate 1, two homogeneously doped piezoresistive beams 1a, 1b extend to the seismic mass 3, which is therefore connected to the substrate 1 via these beams 1a, 1b. Below the beams 1a, 1a and the seismic mass 3, there is a cavity K.

The insulation trench G between the piezoresistive beams 1a, 1b may also be configured as a narrow insulation trench (STI). In this way, the beams 1a, 1b can be placed closer to the rotation point, the effect of which is to amplify the lever action.

An acceleration in the x-y plane (substrate plane) acting on the centre of gravity 6 of the seismic mass 3 leads to compression of the beam 1a and extension of the beam 1b, or vice versa. The homogeneous piezoresistive doping of the beams 1a, 1b in this case leads to a change of their electrical resistance. This resistance change can be detected by measuring devices M1, M2 that record the respective instantaneous resistances of the beams 1a, 1b, which are denoted by R1a and R1b, respectively. This recorded resistance change is therefore a measure of the deflection of the seismic mass 3 from its equilibrium position.

In the present embodiment, this recording is carried out separately for the two piezoresistive beams 1a, 1b, to which end an insulation trench 11a is provided in the substrate 1 for DC separation.

Furthermore, it is also to be noted that the two DC-separated halves of the substrate 1 must be mechanically connected to the underlying substrate 1, but electrically separated (for example by means of a DC-isolating sacrificial layer below the entire sensor). In this case, during the etching, the sacrificial layer must be removed below the mass and beams and remain below the substrate 1.

In order to record the resistance change there is series connection of the substrate 1 to the respective beams 1a or 1b and a respective conductor track 2a, 2b provided on the upper side of the beams 1a, 1b. The conductor tracks 2a, 2b cover the upper side partially or fully, and in this example are structured from a metal layer. In particular, the respective conductor tracks 2a, 2b in the present exemplary embodiment extend, starting from the seismic mass 3, over the entire beam 1a, 1b into the region of the substrate 1. In order to avoid a short circuit with the substrate 1, below the conductor tracks 2a, 2b in the region of the substrate 1 there is an electrical insulation layer between the conductor tracks 2a, 2b and the substrate 1. The insulation layer I is likewise provided between the conductor tracks 2a, 2b and the beams 1a, 1b except for a respective contact region K, where the conductor tracks 2a, 2b make electrical contact with the beams 1a, 1b. This insulation layer I is illustrated particularly in FIGS. 2b and 2c.

The measuring devices M1 and M2 are respectively connected via conduction regions L1, L2 and a contact K1 on the one hand to the substrate, and on the other hand via lines L3 and L4, respectively, and contact K3 and contact K4, respectively, to the conductor tracks 2a, 2b.

Figure 6:
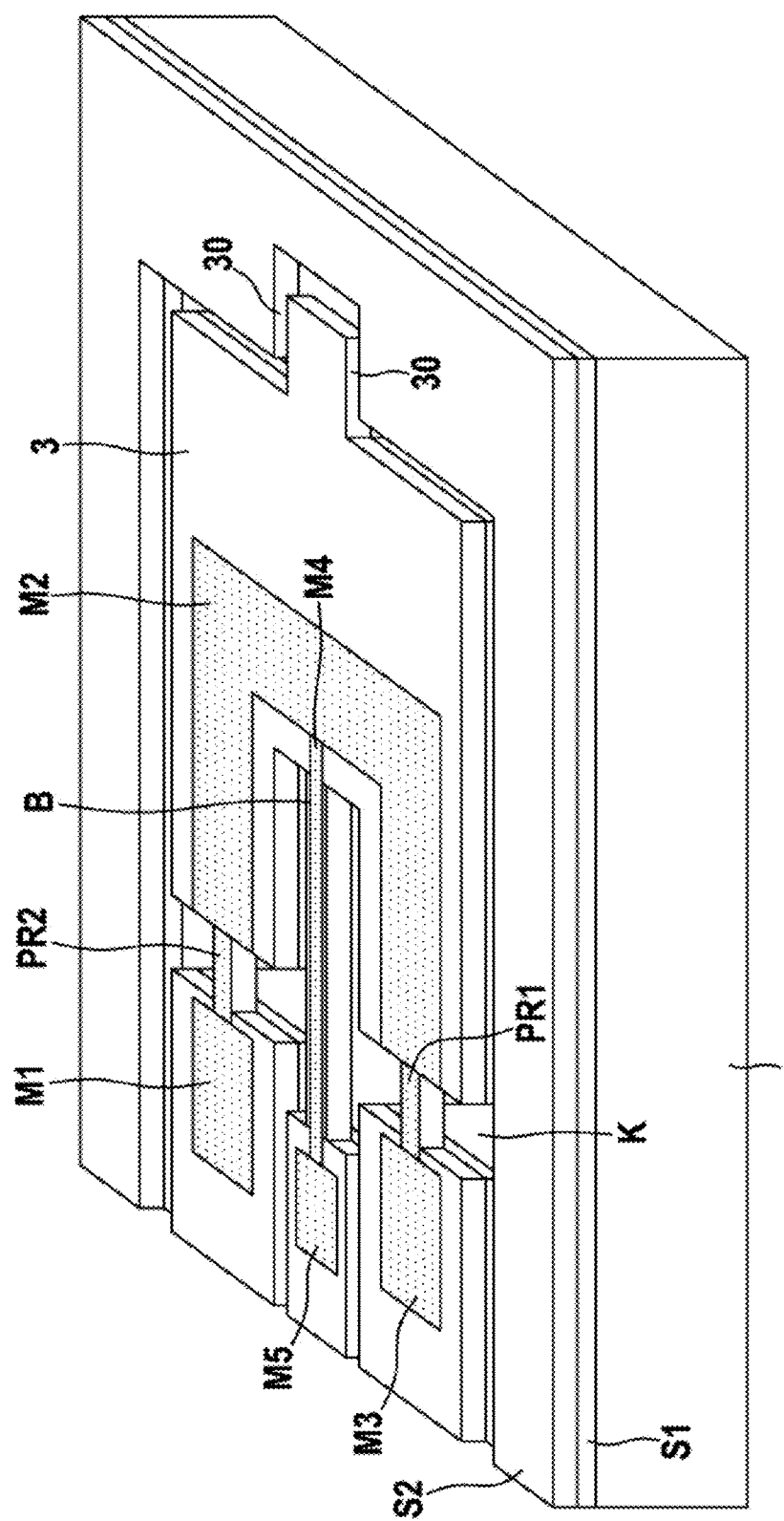
FIG. 6 illustrates a perspective view of a known piezoresistive micromechanical sensor component in the form of a micromechanical acceleration sensor arrangement.

Although separate evaluation of the resistance changes of the resistances R1a and R1b of the piezoelectric beams 1a, 1b is provided in this exemplary embodiment, the beams 1a, 1b may also be evaluated together, for example in a half-bridge circuit similarly as in FIG. 6, as explained above. It is also possible to provide only a single piezoresistive beam, if the necessary stabilization criteria can be satisfied in this way.

It is furthermore possible to provide a plurality of feedbacks on a single piezoresistive beam, which are evaluated separately.

Figure 3:
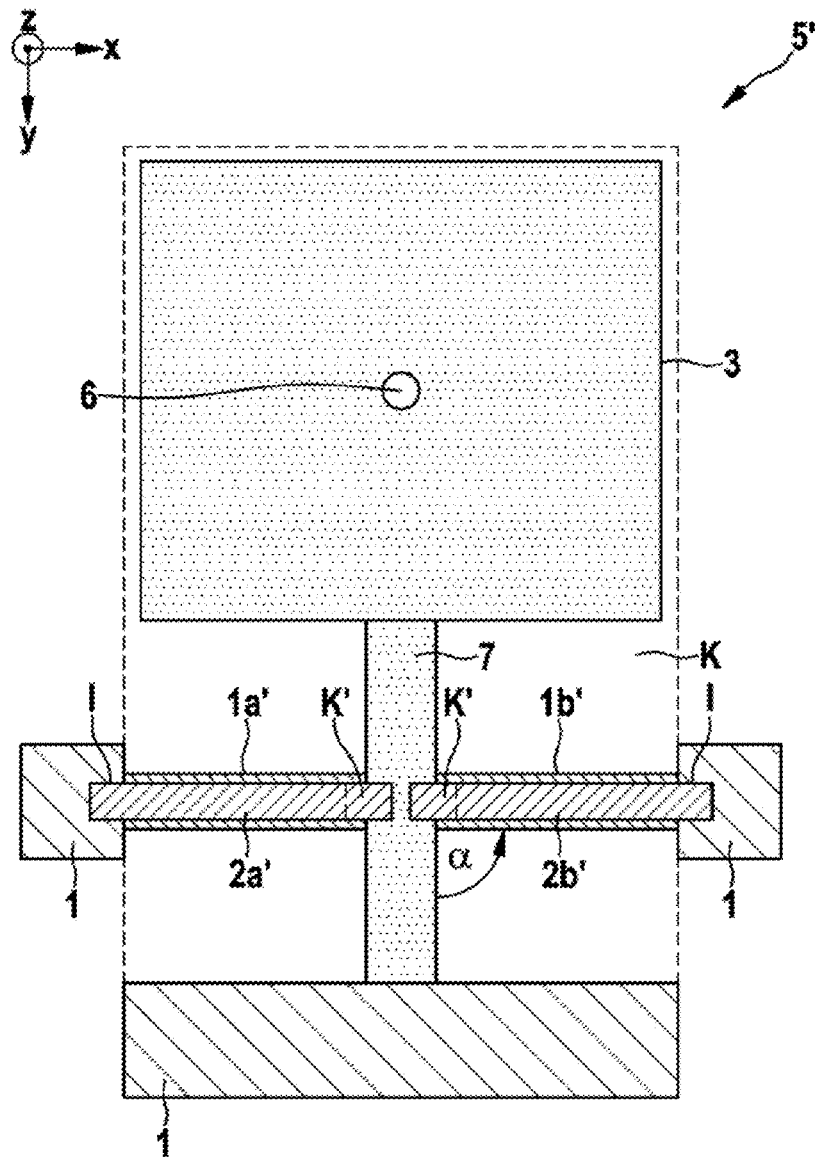
FIG. 3 illustrates a plan view of a piezoresistive micromechanical sensor component in the form of a micromechanical acceleration sensor arrangement according to a second embodiment of the present disclosure.

FIG. 3 is a plan view of a piezoresistive micromechanical sensor component in the form of a micromechanical acceleration sensor arrangement 5' according to a second embodiment of the present disclosure.

In the second embodiment, shown in FIG. 3, an undoped bending beam 7 is provided which connects the seismic mass 3 to the substrate 1. Here, the homogeneously doped piezoresistive beams 1a', 1b' are provided not between the substrate 1 and the seismic mass 3 but between the substrate 1 and this bending beam 7. Such a configuration, the piezoresistive beams 1a', 1b' being placed at an angle α (here: 90°) with respect to the bending beam 7, allows greater geometrical freedom, for example a modified length of the beams 1a, 1b with a constant distance between the centre of gravity 6 of the seismic mass 3 and the point of suspension from the substrate 1 (lever arm length).

The angle α is of course not restricted to 90°, but may be varied freely. Also, the beams 1a', 1b' do not need to have the same angle α.

The conductor tracks 2a', 2b' provided on the piezoresistive beams 1a', 1b' are structured in precisely the same way as in the first embodiment according to FIG. 1 and allow the evaluation, already described in connection with FIG. 1, of the resistance change of the piezoresistive beams 1a', 1b'. As in the first example, the insulation layer I is provided between the conductor tracks 2a', 2b' and the beams 1a', 1b' or the substrate 1, as far as a respective contact region K' where the conductor tracks 2a', 2b' make electrical contact with the beams 1a', 1b'.

Figure 4:
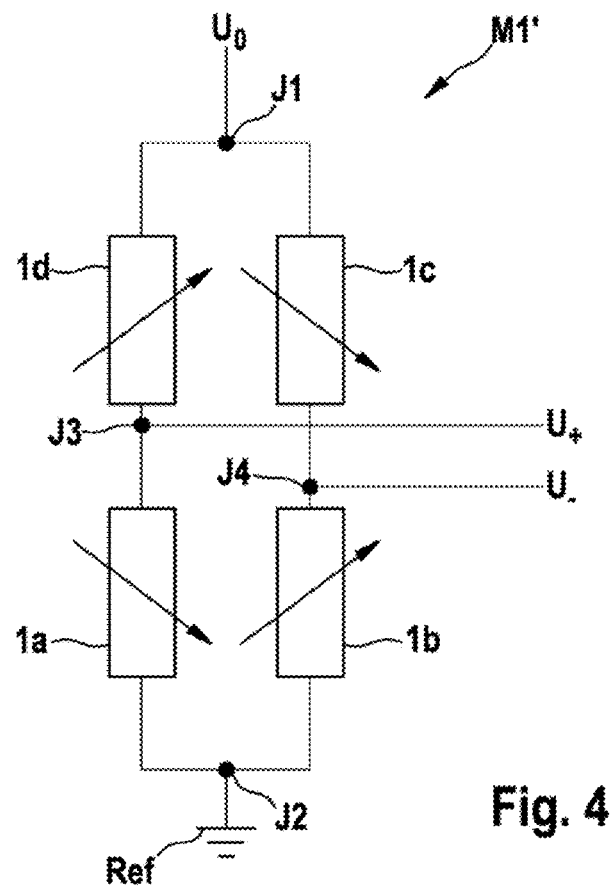
FIG. 4 illustrates a first measuring device to explain a first embodiment of a measuring method using the piezoresistive micromechanical sensor component according to the disclosure.

FIG. 4 is a first measuring device to explain a first embodiment of a measuring method using the piezoresistive micromechanical sensor component according to the disclosure.

The measuring device M1' represented in FIG. 4 is based on full-bridge interconnection of four piezoresistive beams 1a, 1b, 1c, 1d, which are connected pairwise via connection nodes J1, J2, J3, J4 in parallel between a supply potential $U_O$ and a reference potential REF. The tapping to record the resistance change takes place at the connection nodes J3, J4 and, in the known way, delivers voltage values $U_+$ and $U_-$ which are a direct measure of the resistance change when the seismic mass 3 is deflected.

The four piezoresistive beams 1a, 1b, 1c, 1d either may be provided on a single seismic mass 3 or, alternatively, may be formed by two acceleration sensors lying next to one another, in which case the associated two seismic masses may optionally also be mechanically coupled to one another.

Figure 5:
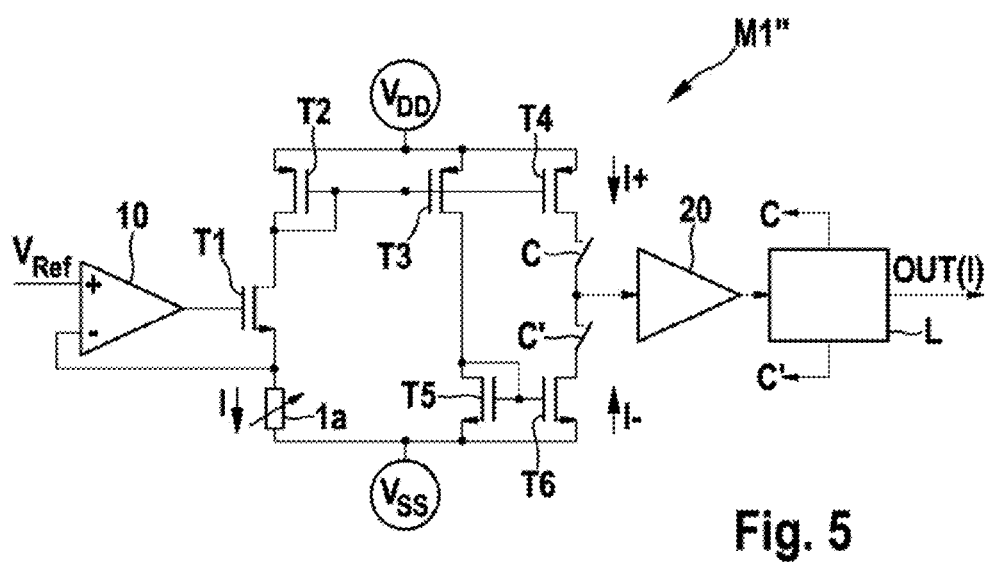
FIG. 5 illustrates a second measuring device to explain a second embodiment of a measuring method using the piezoresistive micromechanical sensor component according to the disclosure.

FIG. 5 is a second measuring device to explain a second embodiment of a measuring method using the piezoresistive micromechanical sensor component according to the disclosure.

The measuring device M1' shown in FIG. 5 is a current mirror circuit arrangement with sigma-delta modulation. A differential amplifier 10, to which a reference voltage $V_{REF}$ is applied, ensures that the voltage drop across the piezoresistive beam 1a is always equal to the reference voltage $V_{REF}$. This is done by appropriate driving of a transistor T1 which, together with a further transistor T2, is connected in series with the piezoresistive beam 1a. The current I flows through the piezoresistive beam 1a, starting from a supply voltage source $V_{BD}$ via the transistor T2 and the transistor T1 through the piezoresistive beam 1a to a reference voltage source $V_{SS}$ (conventionally ground potential). The current occurring in this branch varies with the resistance change of the piezoresistive beam 1a owing to the deflection of the seismic mass 3 connected thereto.

A further branch is formed by the transistors T3, T5 connected in series and the transistors T4 and T6 connected in series, these respectively being connected as a current mirror so that a positive current value $I^+$, which flows through the piezoresistive beam 1a, flows through the transistor T4 and a negative current $I^-$, which flows through the piezoresistive beam 1a, flows through the transistor T6, when a respective associated controllable switch C or C' is closed.

A logic device L alternately causes the switches C, C' to be closed, and during the closure a respective flow of current is integrated in an integrator 20, the mean value of which is zero. The switching ratio of the switches C, C' then represents the current I flowing through the piezoresistive beam, which is delivered as an output signal OUT(I) of the measuring device M1".

Although the present disclosure has been explained above with the aid of preferred exemplary embodiments, it is not restricted thereto but may also be implemented in another way.

In both exemplary embodiments, the conductor tracks 1a, 1b and 1a', 1b', respectively, are structured from a metal layer. It is, however, readily possible for these beams also to be formed by heavily doped semiconductor layers or other conductor track layers.

Although the present disclosure has been explained with reference to piezoresistive micromechanical acceleration sensors, it is not restricted thereto but may also be used for other piezoresistive micromechanical components, for example rotation rate sensors, pressure sensors, etc.

Besides the acceleration sensor presented, with a recording direction in the x-y plane, the piezoresistive micromechanical sensor component according to the disclosure may also be used for detection in the z-direction. Then, the conductor track 2a, 2b constitutes asymmetric stiffening which, under the effect of a z-acceleration, leads to a homogeneous mechanical stress in the beams 1a, 1b. In this case, the mechanical stress in the beams 1a, 1b takes place in the same direction. In this way, a z-acceleration sensor can be produced with only one beam and one metallic conductor track for feedback.

In principle, an xyz sensor component may even be produced by using one or more lateral and one or more upper and/or lower conductor tracks.

The invention claimed is:

1. A piezoresistive micromechanical sensor component comprising:
a substrate;
a seismic mass suspended deflectably from the substrate;
at least one piezoresistive beam, which is provided between the substrate and the seismic mass and is subject to a resistance change when the seismic mass is deflected, the at least one piezoresistive beam including at least one conductor track, which at least partially covers the at least one piezoresistive beam and extends into a region of the substrate; and
a measuring device, which is electrically connected to the substrate and to the at least one conductor track and is configured to measure the resistance change over a circuit path which extends from the substrate through the piezoresistive beam and from the at least one piezoresistive beam through the at least one conductor track.

2. The sensor component as claimed in claim 1, wherein the seismic mass is suspended from the substrate over the at least one piezoresistive beam.

3. The sensor component as claimed in claim 1, wherein:
the seismic mass is suspended from the substrate over a connecting beam, and
the at least one piezoresistive beam is provided between the connecting beam and the substrate.

4. The sensor component as claimed in claim 1, wherein an electrical insulation layer is provided between a region of the at least one conductor track, which extends in the region of the substrate, and the substrate.

5. The sensor component as claimed in claim 1, wherein:
a plurality of piezoresistive beams are provided between the substrate and the seismic mass,
each piezoresistive beam of the plurality of piezoresistive beams has an upper conductor track which at least partially covers the associated piezoresistive beam and extends into the region of the substrate, and
the measuring device, which is electrically connected to the substrate and to the at least one conductor track, is configured to measure the resistance change over a respective circuit path which extends from the substrate through the respective piezoresistive beam and from the respective piezoresistive beam through the associated upper conductor track.

6. The sensor component as claimed in claim 5, wherein the measuring device is configured to evaluate the resistance changes of the plurality of piezoresistive beams separately.

7. The sensor component as claimed in claim 5, wherein the measuring device is configured to evaluate the resistance changes of the plurality of piezoresistive beams in combination in a half-bridge circuit arrangement or a full-bridge circuit arrangement.

8. The sensor component as claimed in claim 1, wherein the measuring device is configured to evaluate the resistance change of the at least one piezoresistive beam in a current mirror circuit arrangement with sigma-delta modulation.

9. The sensor component as claimed in claim 1, wherein the substrate comprises a trench for DC separation of the circuit path through two neighboring piezoresistive beams.

10. The sensor component as claimed in claim 1, wherein the at least one conductor track is a metal conductor track structured from a metallization layer.

11. The sensor component as claimed in claim 1, wherein a plurality of coupled seismic masses are provided.

12. A measuring method for determining deflections of a seismic mass deflectably suspended from a substrate by means of resistance changes of a piezoresistive beam, which is provided between the substrate and the seismic mass and is subject to the resistance changes when the seismic mass is deflected, comprising:

applying a circuit path which extends from the substrate through the piezoresistive beam and from the piezoresistive beam through at least one conductor track, which at least partially covers the piezoresistive beam and extends into a region of the substrate; and evaluating the resistance changes by means of a measuring device connected to the circuit path in order to determine the deflections of the seismic mass.

13. The measuring method as claimed in claim 12, wherein the resistance changes of a plurality of piezoresistive beams provided between the substrate and the seismic mass are evaluated separately by the measuring device.

14. The measuring method as claimed in claim 12, wherein the resistance changes of a plurality of piezoresistive beams provided between the substrate and the seismic mass are evaluated in combination by the measuring device in a half-bridge circuit arrangement or a full-bridge circuit arrangement.

15. The measuring method as claimed in claim 12, wherein the resistance changes of one or a plurality of piezoresistive beams are evaluated by the measuring device in a current mirror circuit arrangement with sigma-delta modulation.

16. The piezoresistive micromechanical sensor component as claimed in claim 1, wherein said at least one conductor track includes a lateral conductor track and an upper and/or lower conductor track.

\* \* \* \* \*